United States Patent [19]

Fraioli

[11] Patent Number: 4,781,933

[45] Date of Patent: Nov. 1, 1988

[54] INFRARED DEHYDRATOR UNIT FOR MINCED FISH

[76] Inventor: Joseph Fraioli, 8 Seymour Pl., White Plains, N.Y. 10605

[21] Appl. No.: 95,027

[22] Filed: Sep. 10, 1987

Related U.S. Application Data

[63] Continuation-in-part of Ser. No. 937,220, Dec. 3, 1986, Pat. No. 4,702,693.

[51] Int. Cl.[4] ............................ A23L 3/40; F26B 3/28

[52] U.S. Cl. ............................................ 426/242; 34/4; 34/39; 99/348; 99/483; 126/92 AC; 426/465; 426/643

[58] Field of Search ......................... 426/242, 465, 643; 34/4, 39; 99/483, 348; 126/92 R, 92 AC; 431/348; 250/453.1, 504 R

[56] References Cited

U.S. PATENT DOCUMENTS 2,391,195 12/1945 Ross et al. ................................ 34/4

4,693,013 9/1987 Pabst et al. ................................ 34/4

*Primary Examiner*—George Yeung

*Attorney, Agent, or Firm*—Michael Ebert

[57] ABSTRACT

An infrared dehydrator unit for minced fish to produce an edible fish product. The unit is constituted by a gas-fired infrared heater provided with a refractory body having a radiation horn from which infrared rays are projected into the interior of a tank containing a load of minced fish to be dehydrated. The tank is provided with an agitator acting to pick up and expose all pieces of the load to the rays to effect dehydration thereof. The radiation pattern of the horn is such as to confine the projected rays to the exposed pieces of the load and to avoid striking and heating the sides of the tank. In this way, scorching and sticking of the agitated pieces when they make contact with these side walls are prevented. As a consequence, the dehydrated pieces are of substantially uniform quality and waste thereof is obviated.

9 Claims, 3 Drawing Sheets

INFRARED DEHYDRATOR UNIT FOR MINCED FISH

RELATED APPLICATION

This application is a continuation-in-part of my copending application Ser. No. 937,220, filed Dec. 3, 1986 entitled "Gas-Fired Infrared Heater," whose entire disclosure is incorporated herein by reference, now U.S. Pat. No. 4,702,693.

BACKGROUND OF INVENTION

1. Field of Invention

This invention relates generally to gas-fired infrared heaters for processing food, and more particularly to an infrared dehydrator unit for minced fish to produce an edible food product.

2. Status of Prior Art

My prior U.S. Pat. No. 4,507,083 and my above-identified copending patent application disclose gas-fired heaters for projecting an infrared (IR) beam in a radiation pattern having a predetermined pattern or geometry for irradiating a food product to effect uniform heating thereof at a rapid rate.

The transfer of heat takes place by three processes: conduction, convection and radiation. In conduction, heat is transferred through a body by the short range interaction of molecules and/or electrons. Convection involves the transfer of heat by the combined mechanisms of fluid mixing and conduction. In radiation, electromagnetic energy is emitted toward a body and the energy incident thereto is absorbed by the body to raise its temperature. Radiant heating, therefore, differs from both convection and conduction heating, for the presence of matter is not required for the transmission of radiant energy.

According to the Stefan-Boltzmann law, the rate of heat transfer between a source of radiated heat whose temperature is $T_s$ and an absorbing body whose temperature is $T_b$ is equal to $T_s^4 - T_b^4$; that is, to the difference between the fourth powers of these temperature values. In convection heating, the rate of heat transfer is proportional only to the temperature difference between the body being heated and the surrounding atmosphere. Hence convection heating is inherently very slow, as compared to the nearly instantaneous effects of radiant heating.

Radiation heaters in present commercial use are of the infrared type, the infrared band of thermal radiation lying within the electromagnetic wave spectrum. The quality and intensity of radiation in the infrared band of 0.7 microns to 400 microns depends on the temperature of the radiating body. If, therefore, the radiating body is a refractory ceramic heated by a gas-fired jet burner, one can only accurately adjust the quality and intensity of the IR radiation if it is possible to carefully control the operation of the gas-fired burner.

Despite the fact that IR heaters are much more economical to operate and act with extreme rapidity, and IR heaters are therefore far superior in this regard to convection ovens for cooking or baking food, they have enjoyed limited success. The reason for this is that commercially available gas-fired IR heaters are relatively difficult to control and also give rise to an uneven heating action.

Effective infrared heating depends not only on the radiant source temperature but also on what is referred to as the "geometric view factor." This factor determines the relationship between the pattern of IR radiation and the surface of the product being heated. With the typical IR heating arrangement, portions of the product to be heated are more completely exposed to IR rays and will be heated more rapidly to a high temperature than those portions that are not as fully exposed. As a consequence, the product may not be properly heated.

To overcome these limitations, the infrared heater disclosed in my prior U.S. Pat. No. 4,507,083 is adapted to project an infrared beam in a radiation pattern having a predetermined geometry for irradiating the surface of the food product or other body to effect uniform heating thereof at a rapid rate. The heater includes a ribbon-type burner having an elongated pre-mix casing into which is fed air and gas, and an outlet extending along a slot in the casing and projecting therefrom. The outlet is provided with two sets of corrugated ribbons separated by a gas pressure chamber, whereby the air-gas mixture from the casing passes through one set into the chamber where the pressure thereof is equalized before the mixture passes through the other set from which it emerges as a sheet of flange of uniform intensity. The outlet is inserted in the longitudinal socket of a refractory body to impinge on a surface thereof whereby the surface is heated to a temperature level causing the surface to emit infrared energy which is projected by an array of radiation horns formed in the assembly.

The gas-fired infrared heater disclosed in my copending application is also adapted to project an infrared beam in a directional radiation pattern. The heater is constituted by a ribbon-type burner and a refractory body capable of radiating infrared energy when heated to an elevated temperature by the burner. The burner is formed by a metal pipe having a longitudinally-extending outlet defined by a pair of parallel plates projecting laterally from the pipe and having a set of corrugated ribbons therein, a pad of thermal insulation being secured to the outer surface of each plate, whereby when a mixture of air and gas is fed into the pipe and ignited, a sheet of flame emerges from the outlet.

The gas fueled burner is received within a longitudinally-extending internal channel in the refractory body, the outlet being then aligned with an internal cavity so that the flame emerging from the outlet impinges on a surface of the cavity to heat this surface to an elevated temperature causing it to emit infrared radiation. The cavity communicates with an array of openings in the body which form radiation horns to produce the desired directional infrared radiation pattern. Because the burner is thermally shielded in the channel, metal fatigue and deleterious distortion of the ribbons is avoided even at very high operating temperatures.

The present invention is concerned with the dehydration of raw fish in minced form to produce an edible food product. U.S. Pat. No. 4,405,653 to Gray (1983) discloses a dehydrated fibrous fish product adapted for human consumption and a process for producing this product which is prepared from raw fish or raw fish scraps, fresh or frozen. The fish is processed by a onestep, reduced pressure dehyration in the absence of air. The final form of the dehydrated product has a fibrous texture and is off-white in color. The product is unique in that the odor-producing bodies, fats and oils are not altered or extracted. When the product is rehydrated or reconstitute in water, it has the same nutritional value, odor and taste as does the whole fish.

As pointed out in the Gray patent, his product needs no refrigeration. It increases in weight by up to 80% when mixed with water and can be used to form the basis of a food by itself or it may be added to rice, flour, bread, potato, or other vegetables and foods as desired by market preference. It can be shaped or combined with other textures to be reconstituted into fillet form. It is especially useful in countries where refrigeration is in short supply.

The Gray process for manufacturing this food product begins with conversion of the raw fish material to a relatively uniform particulate size which is easily dried. The eviscerated whole fish and/or fish parts from commercial fresh fish filleting operations are subject to processing in a meat-bone separator whereby the fish flesh is removed from the bones and gristle. The fish flesh is in a minced form following this step. This minced fish and/or fish scrap from commercial frozen fish block cutting operations are then subjected to treatment in a vacuum (reduced pressure) dehydrating system. According to Gray, this use of reduced pressure is necessary since the final product characteristics cannot be met if oxygen (an oxidizing atmosphere) is present in a drying system.

As a practical matter, a fish dehydration technique that requires that a load of minced fish be vacuum dehydrated by vacuum drum drying, by freeze drying or similar means has serious drawbacks which militate against mass production of the food product; for this dehydration technique is costly and time-consuming as well as inefficient.

In vacuum dehydration, the load must be transported into a vacuum chamber and the air must be evacuated before heating is commenced. In the course of heating within the evacuated chamber, the evaporated moisture must be withdrawn from the chamber, and upon completion of dehydration, the load must be transported out of the chamber.

In heating a minced fish load to a temperature of up to 90° C. as called for in the Gray patent, the walls of the tank or drum containing this load are heated to an elevated temperature and the pieces of fish tend to stick to these walls and become scorched. As a consequence, a significant percentage of the dehydrated fish is burned. The scorched pieces of fish lack the desired off-white color and therefore must be discarded. And since the walls of the tank have pieces of scorched fish sticking thereon, the tank walls must be scrubbed and cleaned before another fish load can be introduced therein.

SUMMARY OF INVENTION

In view of the foregoing, the main object of this invention is to provide an infrared dehydrator unit for minced fish which operates efficiently under normal atmospheric conditions to produce an edible fish product in a relatively short period and at a lower cost.

A significant advantage of a unit in accordance with the invention is that it lends itself to the mass production of a high quality fish product without scorching and the waste of any portion of the product. Another advantage is that with IR heating, the energy is concentrated on the fish being dehydrated and is fully utilized.

More particularly, an object of this invention is to provide a dehydrator unit which makes use of a gas-fired infrared heater.

Briefly stated, these objects are attained in an infrared dehydrator unit for minced fish to produce an edible fish product. The unit is constituted by a gas-fired infrared heater provided with a refractory body having a radiation horn from which infrared rays are projected into the interior of a tank containing a load of minced fish to be dehydrated. The tank is provided with an agitator acting to pick up and expose all pieces of the load to the rays to effect dehydration thereof. The radiation pattern of the horn is such as to confine the projected rays to the exposed pieces of the load and to avoid striking and heating the sides of the tank. In this way, scorching and sticking of the agitated pieces when they make contact with these side walls are prevented. As a consequence, the dehydrated pieces are of substantially uniform quality and waste thereof is obviated.

BRIEF DESCRIPTION OF DRAWING

For a better understanding of the invention as well as other objects and further features thereof, reference is made to the following detailed description to be read in conjunction with the accompanying drawings, wherein.

DESCRIPTION OF INVENTION

Figure 1:
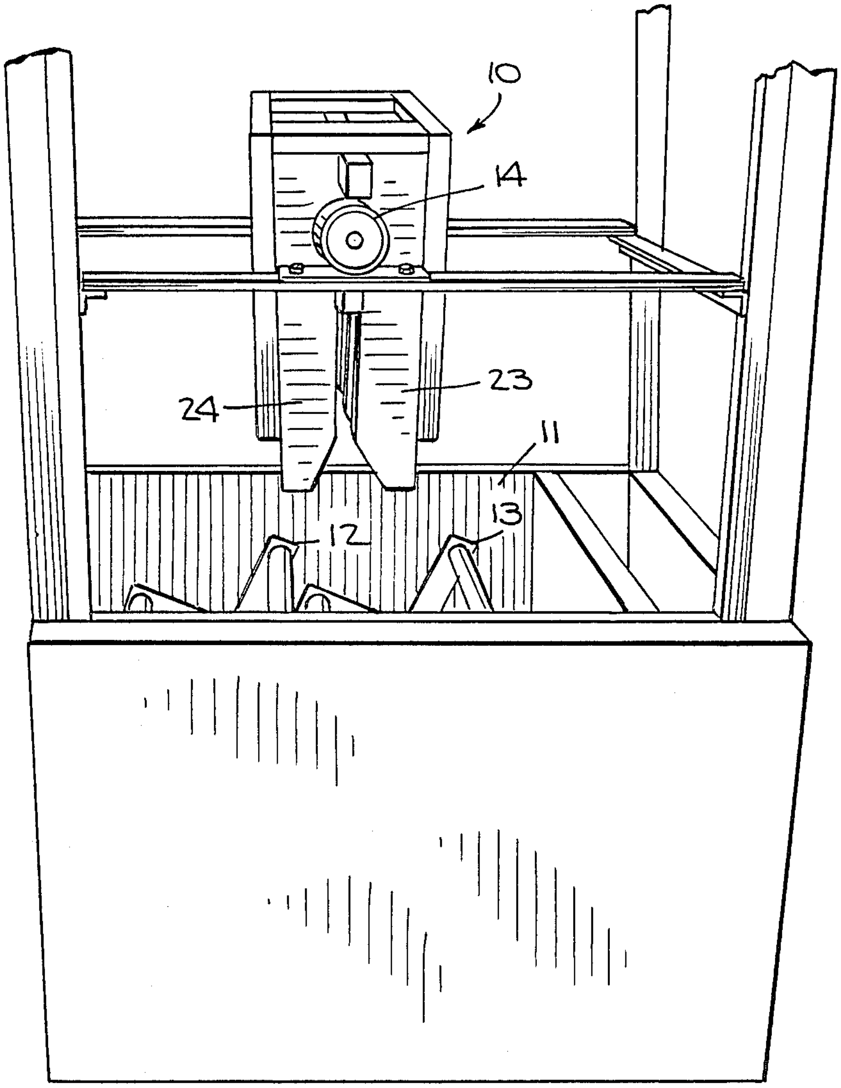
FIG. 1 is a perspective view of an infrared dehydration unit in accordance with the invention for producing an edible fish product.
Figure 4:
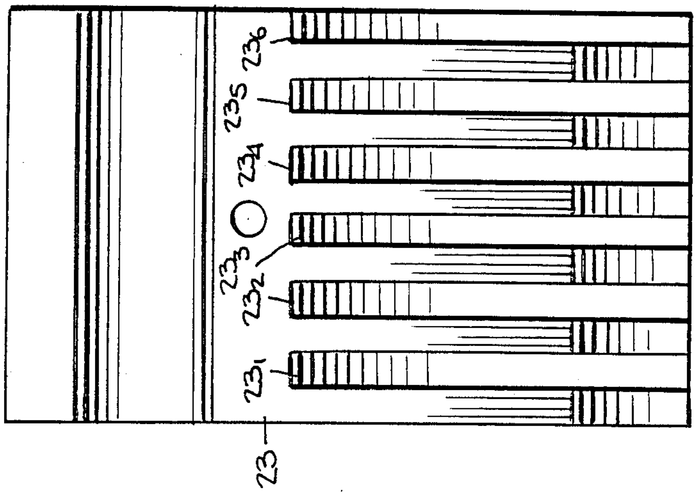
FIG. 4 is an elevational view of the other modules.

Referring now to FIG. 1, there is shown an infrared dehydrator unit in accordance with the invention which is constituted by an IR heater, generally designated by numeral 10 supported above an open tank 11 for receiving a load of minced fish to be dehydrated. The tank is provided with an agitator in the form of a pair of intermeshing paddle wheels 12 and 13 that are motor driven. The rotating paddle wheels act to pick up and expose the pieces of fish in the load to infrared radiation projected into the tank by IR heater 10.

Figure 2:
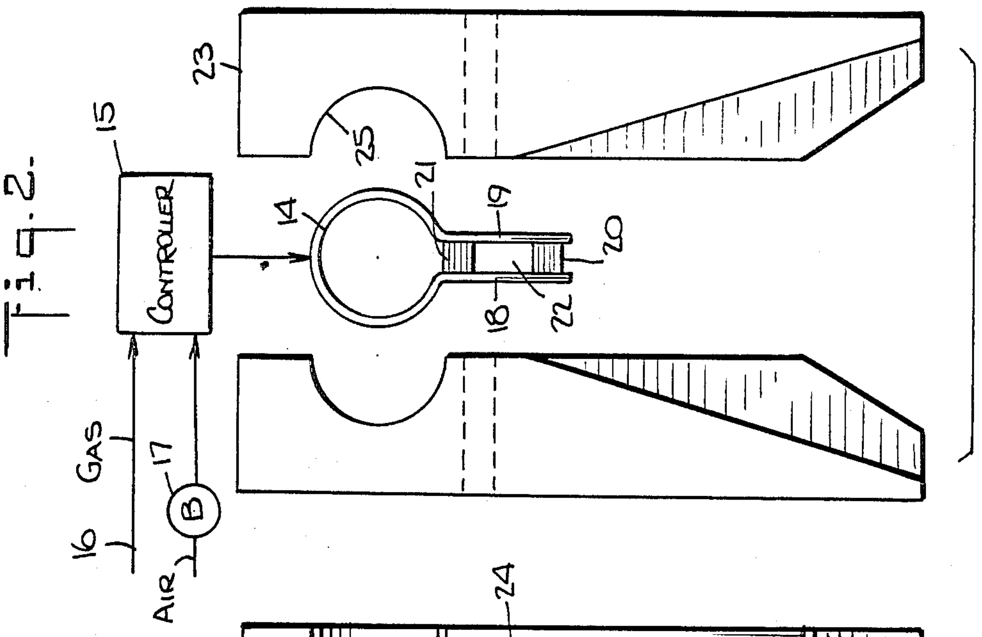
FIG. 2 is an exploded view of the infrared heater included in the unit, the IR heater being constituted by a ribbon burner sandwiched between a pair of modules forming the refractory body of the IR heater.
Figure 3:
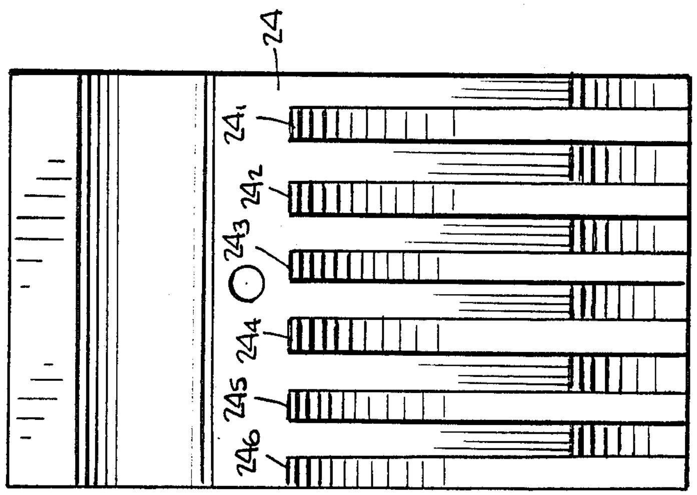
FIG. 3 is an elevational view of one of the modules.

The infrared heater 10 is constituted, as shown in FIG. 2, by a ribbon-type gas-air burner which cooperates with a refractory body.

The gas-air burner includes a pre-mix pipe 14 of a suitable metal such as cast iron or stainless steel. Pipe 14 is supplied with a mixture of air and gas through a dual valve air-gas controller 15, preferably of the type disclosed in my U.S. Pat. No. 4,640,678. This controller is supplied with pressurized gas through an inlet line 16 and pressurized air through an air blower 17.

Controller 15 is adapted to mix the incoming air and gas to produce a combustible output mixture and to adjust the flow rate thereof without, however, altering the air/gas ratio. The output of controller 13 is supplied to the inlet of burner pipe 14 whose other end is closed. The preferred air/gas ratio is the stoichiometric ratio that results in complete combustion in the burner. Thus in the case of methane gas, this ratio is 64 grams of oxygen to 16 grams of methane. However, every chemical reaction has its characteristic proportions; hence the ratio for optimum efficiency will depend on the gaseous fuel being used.

Since the optimum ratio, once it is set, is never varied by controller 15, this ratio is maintained as the flow rate is adjusted. Hence one may accurately vary the intensity of heat produced by the burner and the resultant temperature of the refractory body.

The pre-mix pipe 14 of the burner is provided with a longitudinally-extending slot which is defined by a pair of parallel metal plates 18 and 19 integral with pipe 14 and extending laterally therefrom to form the outlet of the burner. The front end of the outlet is occupied by a stack of corrugated ribbons forming a first set 20. The corrugated ribbon stack creates an array of minute jet openings through which the gas-air mixture is forced. The configuration of the ribbons is such as to provide two distinct type of jet ports, one being a main flame jet port which is of the high velocity type causing the gas-air mixture to project with sufficient energy to form a long flame, the others on either side of the main flame jet port being pilot jet ports of the low velocity type to produce relatively short flames for sustaining the long main flame. Because of the longitudinally-extending outlet arrangement and the myriad jet openings created by the ribbons, the projected main flame is not composed of discrete jets, but assumes a sheet-like form.

At the inner end of the burner outlet is a parallel second set 21 of corrugated ribbons. These are separated from the first set by an air-gas pressure chamber 22. In operation, the air and gas fed into pipe 14 are pre-mixed therein, the mixture being forced through the second set of ribbons 21 to pass into the pressure chamber 22 for more thorough secondary mixing therein.

Because the flow of the mixture through the outlet is retarded between the two sets of ribbons, both of which offer fluidic impedance, this retarding action serves to equalize the pressure in chamber 22. Thus while the pressure throughout the pre-mix chamber tends to vary at various regions therein, the pressure of the mixture when it is ejected into the atmosphere from the first set of ribbons is equalized, and the resultant sheet of flame has an equalized intensity giving rise to an infrared beam of uniform intensity.

Burner 10 is sandwiched between the complementary modular pieces 23 and 24 of a block of refractory material. A preferred material for this purpose is "Cera Form," a refractory produced by Johns-Manville of Denver, Colorado, made from a wet slurry formulation that includes refractory fibers and multi-component binder systems. Thus "Cera Form" type 103 includes Alumina (39.6%) and Silica (50.7%). Because the material can be molded, it can be made into the special shapes called for in the present application. In practice, however, the refractory body may be molded in integral form rather than being made up of individual blocks or modules. While a fibrous refractory body has been disclosed, the infrared emitting material may be of ceramic or any other suitable composition.

The pieces 23 and 24 of each block are molded or otherwise formed so as to create, when the pieces are joined together, an internal channel 25 therein whose dimensions are such as to snugly accommodate ribbon burner 10.

Burner 10 is so placed in the channel as to align its outlet with cavity C in the refractory body so that the flame emitted therefrom impinges on a wall surface to produce a high density flux of maximum radiance. The flame is not the source of infrared radiation, for its function is to heat the surface of the refractory to a temperature level (i.e., 1800° to 2200° F.) at which the refractory then emits infrared energy in the micron range to effect the desired heating of the product subjected to the IR radiation pattern.

As the temperature of the refractory surface is increased, the maximum IR radiation occurs at shorter wavelengths and has a much higher intensity, with an increasingly greater portion of the radiation occurring nearer the visible range in the electromagnetic spectrum. Infrared rays travel in a straight line until they strike an absorbing surface; hence radiant heat follows the same physical laws as light waves and travel at the same speed.

Formed in piece 23 is a parallel array of six rectangular radiation horns 23$_1$ to 23$_6$ having converging side walls. Similarly formed in piece 24 is a parallel array of six radiation horns 24$_1$ to 24$_6$. Hence the infrared radiation emitted from the surface of the cavity is projected through the horns to provide a radiation pattern which depends on the geometry of the horns.

Figure 5:
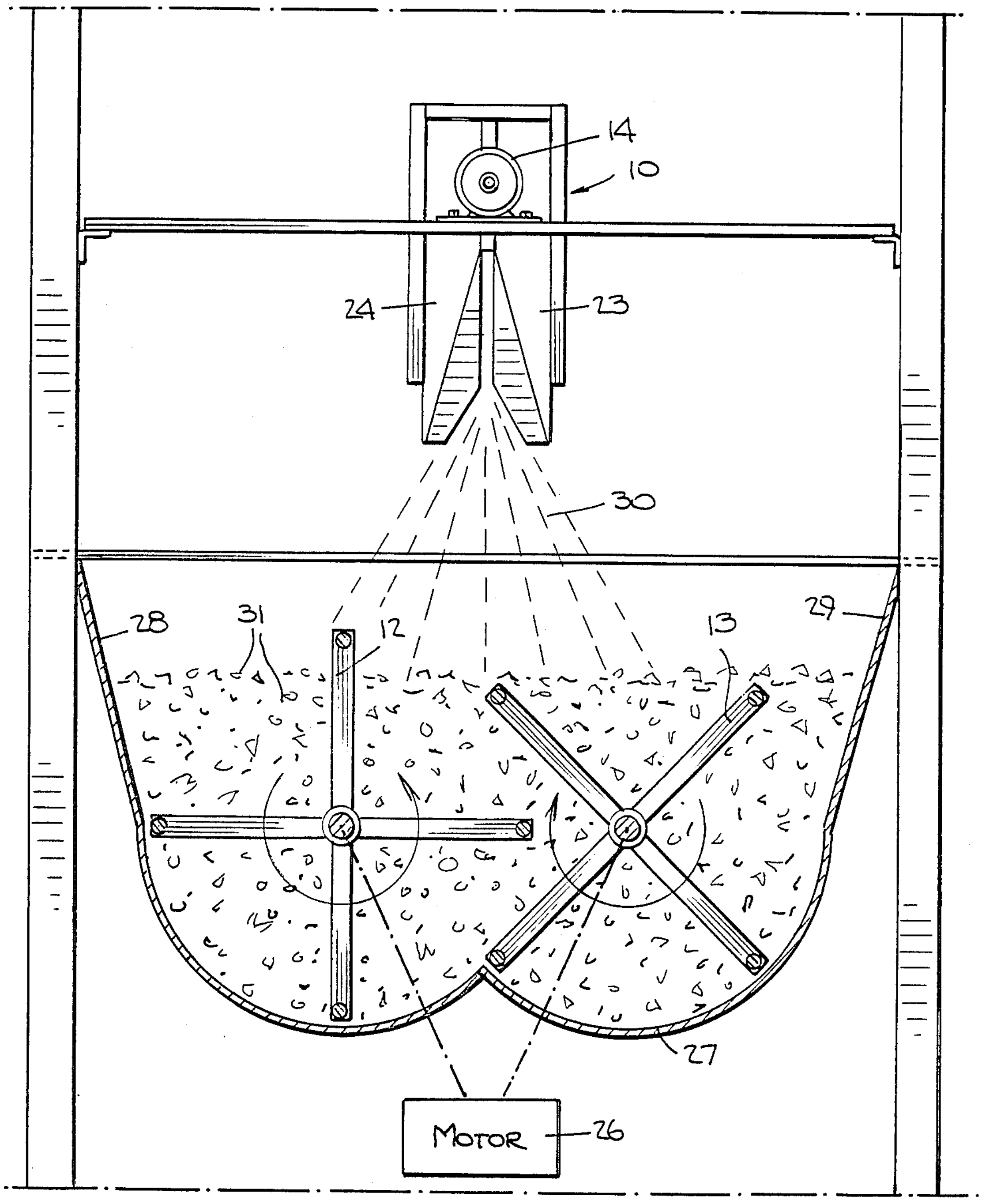
FIG. 5 schematically illustrates the unit in a sectional view.

As shown in FIG. 5, paddle wheels 12 and 13 are driven to rotate in intermeshing relationship by a motor 26. The bottom wall 27 of the tank is in a double-U formation to conform to the circular orbits of the related paddle wheels. The bottom wall is integral at one end with an inclined side wall 28 and at the other end with an inclined side wall 29 to create a trough-like structure which is completed by a pair of vertical side walls, as best seen in FIG. 1.

The geometry of the radiation horns is such as to create a diverging infrared beam 30 as indicated by dashed lines in FIG. 5, which directs the projected rays toward paddle wheels 12 and 13 and hence toward the pieces 31 of minced fish which are being agitated by the paddle wheels so as to expose all pieces in the load to incident IR radiation.

However, the predetermined pattern of the radiation beam is such as to avoid the inclined side walls 28 and 29 of the tank as well as the vertical side walls which together confine the load of minced fish within the tank. As a consequence, the side walls of the tank remain relatively cool and do not scorch the pieces which come in contact with these walls. And because the walls are relatively cool, the fish pieces do not stick thereto.

Dehydration is completed when the residual moisture in the fish is no more than about 10%. Because of the anti-germicidal effect of infrared radiation which penetrates the fish pieces, the bacterial count in the dehydrated product is very low. The final product is a dry, flaky fiber having an off-white color that is fit for human or animal consumption and does not require refrigeration.

The product is completely stable for storage at room temperature for a prolonged period if it is hermetically sealed in a plastic film bag or other sealed package or container. The product is easily reconstituted by the addition of water, and has the same taste, texture and nutritional value as whole fish. We have found that dehydration under normal atmospheric conditions in which oxygen is present has no deleterious effect on the product.

The invention is not limited to the specific form of IR heater shown, for it can be carried out with an IR heater of the type disclosed in my prior patent, if the heater shown in this patent is arranged to produce a restricted radiation pattern which is confined to the fish being processed and does not elevate the temperature of the side walls to a level resulting in scorching of the product. In practice, the unit may be installed under a hood provided with an air blower to draw the moist air discharged from the tank and to feed this air through a suitable filter before discharging it into the interior of the plant or to the exterior thereof.

While there has been shown and described a preferred embodiment of an infrared deyhydrator unit for minced fish in accordance with the invention, it will be appreciated that many changes and modifications may be made therein without, however, departing from the essential spirit thereof. Thus while a preferred form of agitator has been shown, other types may be used for exposing all pieces of the fish in the load to impinging IR radiation.

I claim:

1. A dehydrator unit for minced fish to produce an edible fish product, said unit comprising:

A. an infrared heater provided with a refractory body having a radiation horn from which is projected a diverging beam of infrared rays; and B. a tank disposed in the path of the beam and adapted to contain a load of minced fish to be dehydrated, said tank having side walls confining the load and provided with an agitator to pick up and expose all pieces of the load to the rays incident thereto to effect dehydration of these pieces, said beam having a radiation pattern which substantially confines the projected rays to the pieces and avoids striking said side walls, thereby preventing scorching and sticking of the agitated pieces when they make contact with the side walls.

2. A unit as set forth in claim 2, wherein the infrared heater includes an air-gas ribbon burner which produces a flame which is directed at a surface of the refractory body to cause it to emit infrared radiation through said horn.

3. A unit as set forth in claim 2, wherein said ribbon burner includes a pipe into which air and fuel are fed, said pipe having a longitudinal slot leading into a lateral outlet provided with at least one set of ribbons.

4. A unit as set forth in claim 3, wherein said body is formed by a pair of complementary half sections which are shaped to define a cavity for accommodating the burner and the radiation horn, the pipe and the outlet therefor being received in said cavity and being sandwiched between said half sections.

5. A unit as set forth in claim 1, wherein said agitator is constituted by a pair of intermeshing driven paddle wheels.

6. A unit as set forth in claim 5, wherein said tank has a bottom wall in a double-U formation to conform to the circular orbits of the paddle wheels.

7. The method of producing an edible fish product comprising the steps of:

A. mincing raw fish to produce small pieces thereof;

B. placing a load of the fish pieces in an open tank having side walls;

C. projecting into the tank a beam of infrared rays having a pattern which is directed mainly on the load and substantially avoids the side walls; and D. agitating the pieces in the tank to pick up the pieces in the load thereof and exposing them to the incident beam until such time as the pieces are dehydrated.

8. The method set forth in claim 7, wherein said infrared beam is produced by a gas-fired infrared heater provided with a refractory body having a radiation horn that creates said beam pattern.

9. The method as set forth in claim 7, wherein dehydration is completed when the residual moisture content of the fish pieces is no greater than about 10%.

* * * * *